US009290923B1

(12) United States Patent
Lang et al.

(10) Patent No.: US 9,290,923 B1
(45) Date of Patent: Mar. 22, 2016

(54) FLOW CONTROL DEVICE FOR A STORM WATER MANAGEMENT SYSTEM

(71) Applicant: Lane Enterprises, Inc., Camp Hill, PA (US)

(72) Inventors: Timothy Joel Lang, Forest Hill, MD (US); Patrick X. Collings, Mechanicsburg, PA (US); Douglas K. Graham, Carlisle, PA (US)

(73) Assignee: Lane Enterprises, Inc., Camp Hill, PA (US)

( * ) Notice: Subject to any disclaimer, the term of this patent is extended or adjusted under 35 U.S.C. 154(b) by 267 days.

(21) Appl. No.: 14/069,700

(22) Filed: Nov. 1, 2013

Related U.S. Application Data

(60) Provisional application No. 61/724,033, filed on Nov. 8, 2012.

(51) Int. Cl.
*E03F 1/00* (2006.01)
*F16K 31/18* (2006.01)
*E02B 8/00* (2006.01)
*E02B 8/04* (2006.01)
*G05D 9/02* (2006.01)

(52) U.S. Cl.
CPC ... *E03F 1/00* (2013.01); *E02B 8/00* (2013.01); *E02B 8/04* (2013.01); *E02B 8/045* (2013.01); *F16K 31/18* (2013.01); *G05D 9/02* (2013.01)

(58) Field of Classification Search
CPC .............. E03F 1/00; E02B 8/00; E02B 8/04; E02B 8/045; G05D 9/02; F16K 31/18
USPC ......... 137/15.26, 236.1, 315.06, 315.08, 409, 137/410, 423, 434, 448, 625.42, 625.44, 137/625.45, 627.5, 628, 872, 875; 405/94, 405/96
See application file for complete search history.

(56) References Cited

U.S. PATENT DOCUMENTS

| | | | | |
|---|---|---|---|---|
| 575,172 | A | * | 1/1897 | Rossbach-Roussett G01F 13/006 137/122 |
| 706,526 | A | | 8/1902 | Carlisle |
| 1,802,326 | A | * | 4/1931 | Brooks .................... G01F 23/32 137/398 |
| 2,446,384 | A | * | 8/1948 | Murdock ................ F16K 31/22 137/398 |
| 4,015,629 | A | | 4/1977 | Morgan et al. |
| 4,224,156 | A | | 9/1980 | Pardikes et al. |
| 4,225,434 | A | * | 9/1980 | Ernst ....................... E02B 7/205 137/397 |
| 5,232,307 | A | | 8/1993 | Nouri |
| 5,820,751 | A | | 10/1998 | Faircloth, Jr. |
| 6,997,644 | B2 | | 2/2006 | Fleeger |
| 7,044,165 | B2 | * | 5/2006 | Malenfant ............ G05D 7/0166 137/436 |
| 7,052,206 | B1 | | 5/2006 | Mastromonoco |
| 7,052,208 | B2 | * | 5/2006 | Gardner .................... E02B 8/04 137/407 |
| 7,101,114 | B1 | | 9/2006 | Waters, Jr. |
| 7,125,200 | B1 | | 10/2006 | Fulton |
| 7,341,670 | B2 | | 3/2008 | Ghalib |
| 7,459,090 | B1 | | 12/2008 | Collings |

(Continued)

FOREIGN PATENT DOCUMENTS

DE              3725392 A1 *  2/1989  .............. E03F 5/107

*Primary Examiner* — Mary McManmon
*Assistant Examiner* — Richard K Durden
(74) *Attorney, Agent, or Firm* — Hooker & Habib, P.C.

(57) ABSTRACT

A flow control device for a storm water management system includes a storage chamber and a number of discharge openings extending through the storage chamber. Associated with each opening is a valving mechanism that opens or closes the opening in response to changes in water level in the storage chamber.

23 Claims, 6 Drawing Sheets

(56) References Cited

U.S. PATENT DOCUMENTS

| | | |
|---|---|---|
| 7,762,741 B1 | 7/2010 | Moody |
| 7,790,023 B1 | 9/2010 | Mills |
| 7,985,035 B2 | 7/2011 | Moody |
| 8,021,543 B2 | 9/2011 | Ghalib |
| 8,043,026 B2 | 10/2011 | Moody |
| 2001/0013489 A1 | 8/2001 | Williamson |
| 2010/0284746 A1 | 11/2010 | Moody |
| 2011/0176869 A1 | 7/2011 | Moody |

* cited by examiner

FLOW CONTROL DEVICE FOR A STORM WATER MANAGEMENT SYSTEM

FIELD OF THE DISCLOSURE

This disclosure relates to storm water management, and in particular to a flow control device for a storm water management system.

BACKGROUND OF THE DISCLOSURE

Land development often increases the peak flow rate of storm water runoff as compared to the peak flow rate before development. FIG. 1 illustrates the flow of storm water runoff for a specific rain event on undeveloped land (shown in phantom lines as curve U) as compared to the flow of storm water runoff for the same rain event on the same land after development (shown in dotted lines as curve D). The peak flow rate of the undeveloped land is Q, while the peak flow rate of the developed land is increased to Q'.

Many jurisdictions require that storm water runoff of developed land be managed so that the peak flow rate for the specific rain event does not exceed Q, the peak flow rate of the undeveloped land.

A storm water management system manages storm water runoff from developed land. A storm water system receives the storm water runoff, and is designed to limit the maximum discharge rate for the specific rain event to a particular Q, often the pre-development peak discharge rate.

During the period of the rain event in which the rate of storm water flow into the storm water system exceeds Q, the storm water system must store the excess runoff for discharge later.

An ideal storm water management system would minimize the volume needed to store the excess runoff. An ideal storm water management system would initially discharge runoff at the same rate as the inflow rate into the system. A graph of the discharge rate of the ideal storm water management system would follow the flow rate of curve D of FIG. 1 from the onset of the storm until the intake rate reaches Q. After that point, the discharge rate of the ideal storm water management system would remain a constant Q (shown as the solid line C in FIG. 1) during the period while the inflow rate peaked at Q' and then dropped back down to Q. After that point the ideal storm water management system could begin to empty and discharge runoff at a rate at or below Q (the emptying of the system is shown as solid curve E in FIG. 1).

While the intake rate remains above Q, the volume of runoff represented by the area A in FIG. 1 must be stored for later release. The release of stored runoff makes up the area B shown in FIG. 1.

Storm water management systems often use a flow control device that includes a storage chamber to receive and store runoff, the storage chamber provided with a discharge orifice of fixed size to discharge runoff from the storage chamber. The orifice is sized for a discharge rate of Q when the storage chamber is full. Such storm water management systems do not approach the performance of an ideal storm water management system because they discharge water at a less than optimum rate when filling up.

Other storm management systems utilize multiple fixed orifices at different elevations or divert excess intake into other storage chambers. Although these systems may better approach the ideal system than a simple fixed orifice system, their performance may still be lacking or their costs prohibitive for many projects.

Thus there is a need for an improved storm water management system that more closely approaches the performance of an ideal storm water management system.

BRIEF SUMMARY OF THE DISCLOSURE

Disclosed is an improved storm water management system.

The system includes a flow control device that includes a storage chamber or head chamber and openings that discharge water from the storage chamber. Associated with each opening is a valving mechanism that is operable to open or close the opening in response to changes in water level in the storage chamber.

Preferred embodiments of the system includes a fixed size orifice (the term "orifice" as used herein refers to a discharge opening that is always open) that also discharges water from the storage chamber, and a number of openings that are vertically spaced from one another to be at different elevations.

Water is discharged from the storage chamber through the orifice and simultaneously through one or more of the storage chamber openings. As the water level increases, the lower openings close so that water is discharged only through openings having a relatively low pressure head. This enables the discharge rate from the flow control device to better follow the ideal discharge curve, reducing the required volume of the storage chamber.

In possible embodiments, each valving mechanism includes a door mounted for pivotal movement between opened and closed positions and a float in the storage chamber attached to the door. When the float is submerged, the float generates sufficient buoyant force to maintain the door in its closed position blocking the opening.

The disclosed flow control device provides the engineer a great deal of flexibility in designing a storm water management system that can meet project requirements and goals. The flow control device allows the designer to achieve essentially any outlet or discharge hydrograph desired while still enabling the designer to limit the maximum discharge rate.

Furthermore, the flow control device can be used in both above-ground and below-ground storm water management systems. The flow control device can be used in new construction, or can be retro-fit to existing storm water management systems. Portions of the flow control device can be prefabricated, with project-specific components easily added later or on-site.

Other objects and features of the disclosure will become apparent as the description proceeds, especially when taken in conjunction with the accompanying drawing sheets.

DETAILED DESCRIPTION

Figure 2:
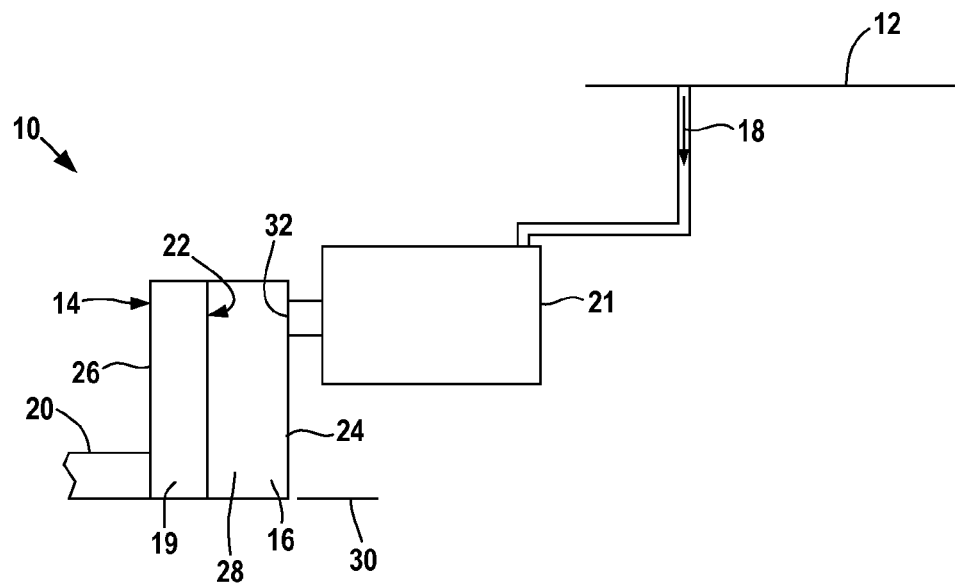
FIG. 2 is a schematic plan view of a storm water management system incorporating a flow control device, the system managing the flow of storm water from a developed area of land.

FIG. 2 illustrates a storm water management system 10 used in managing storm water runoff from a developed area of land 12. The system 10 includes a flow control device 14 that includes a head chamber or storage chamber 16 that receives the storm water runoff (represented by the arrow 18), and discharges the runoff to a discharge chamber 19 in a controlled manner (described in greater detail below). The discharge chamber 19 is connected to a drain pipe 20 for downstream disposal of the runoff.

The runoff may be first received in a retention basin 21 upstream from the flow control device 14 for removal of sediment or debris before flowing to the flow control device 14. Other retention basins or water quality treatment devices may be located either upstream from or downstream from the flow control device 14.

The storm water management system 10 is designed to manage a specific rain event (for example, a 25-year storm event) and will generally include an overflow or diversion line (not shown) that diverts the runoff through or around the flow control device 14 in the event of an even greater magnitude rain event.

The illustrated flow control device 14 is a box-like or generally rectangular structure defining an interior chamber in which the storage chamber 16 is divided or separated from the discharge chamber 19 by a flow control structure 22 described in greater detail below.

The flow control device 14 includes an upstream vertical front wall 24 and a downstream vertical rear wall 26 that cooperate with the flow control structure 22 to enclose and define an interior volume 28 of the storage chamber 16 that receives runoff into the flow control device 14. The interior volume 28 has a bottom or lowest elevation 30 located along the bottom of the flow control device 14.

The internal storage volume 28 of the illustrated storage chamber 16 is sized to hold and manage the discharge of a volume A needed for a maximum discharge rate of Q from the flow control device 14 for the design rain event.

The flow control device 14 includes a fixed intake opening 32 opening into the storage chamber 16 for flowing runoff into the flow control device 14.

Figure 3:
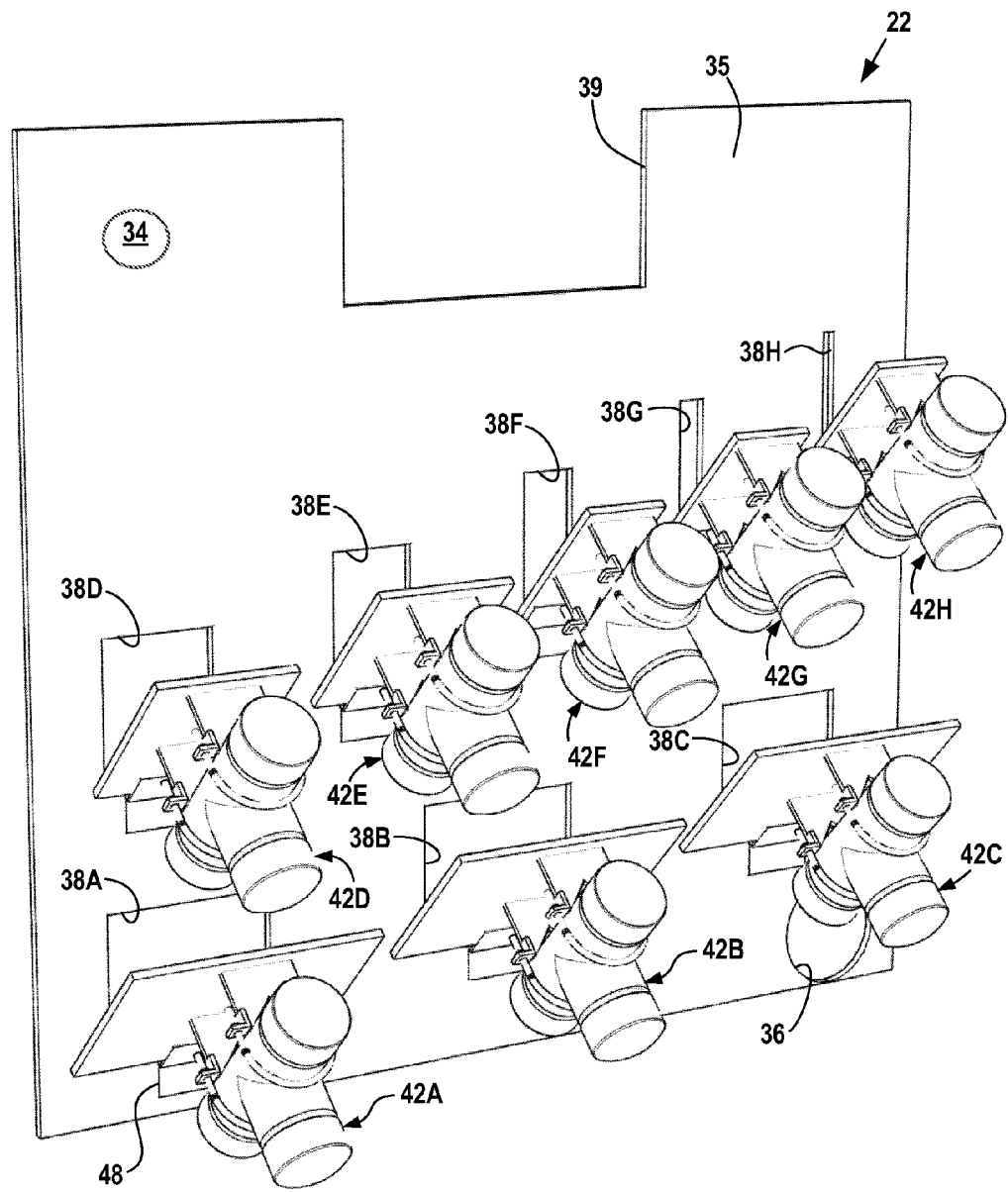
FIG. 3 is a perspective view of the flow control structure of the flow control device with the doors partially open.

FIG. 3 illustrates the flow control device 22. The flow control device 22 includes a flat wall formed from a generally rectangular steel plate 34. The plate 34 separates the storage chamber 16 from the discharge chamber 19 and includes a flat face 35 facing the storage chamber 16. A fixed discharge orifice 36 and a number of additional discharge openings 38 extend through the thickness of the plate 34 and fluidly communicate the storage chamber 16 with the discharge chamber 19. An upper overflow opening 39 is formed on the upper end of the plate 34 to discharge overflow from the storage chamber 16 and into the discharge chamber 19.

The illustrated discharge orifice 36 is a circular orifice located adjacent the bottom elevation 30 so that the elevation of the orifice 36 is substantially the same as the elevation 30.

The illustrated flow control device 14 has seven discharge openings 38A, 38B, 38C, 38D, 38E, 38F, 38G, 38H.

Each discharge opening 38 is rectangularly shaped with vertically-spaced apart horizontal upper and lower edges or sides. In the illustrated embodiment the height and width of each opening 38 is different from the other openings 38. The number, size, shape, and relative positioning of the openings 38 can vary in other embodiments.

The illustrated discharge openings 38 are located above the fixed orifice 36, and are vertically spaced apart from one another at different elevations with respect to the orifice 36. That is, vertically adjacent pairs of openings 38 include a relatively higher opening and a relatively lower opening with respect to the orifice 36. In other possible embodiments, an opening 38 may be located at essentially the same elevation as an orifice or may even extend below an orifice.

Each adjacent pair of openings partially overlaps each other in the vertical direction, that is, a horizontal line drawn from the top of the lower opening of the pair would be spaced vertically above the bottom of the upper opening of the pair.

The lowermost opening 38A vertically overlaps the orifice 36, that is, the opening 38A extends from the orifice 36 vertically above the orifice 36.

The flow control structure 22 additionally includes a number of similar valving mechanisms 42 disposed in the storage chamber 16, each valving mechanism 42 associated with a respective opening 38 and attached to the wall face 35.

Figure 4:
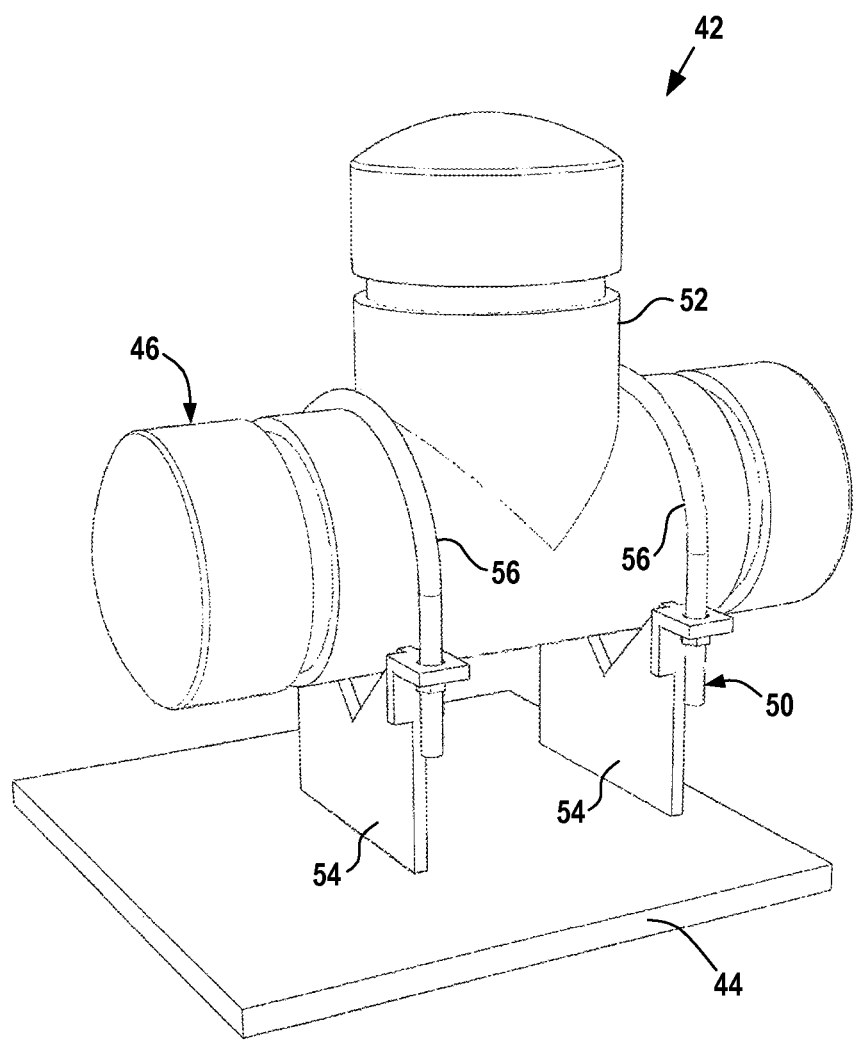
FIG. 4 illustrates a valving assembly of the flow control structure.

Because the valving mechanisms 42 are essentially the same construction, only one valving mechanism 42 will be described in detail. See FIG. 4.

The valving mechanism 42 includes a movable valving member 44 and a drive 46 that moves the valving member 44 between opened and closed positions. When the valving member 44 is in the closed position, the valving member 44 is pressed against the wall face 35 and completely covers the associated discharge opening 38. The closed valving member 44 prevents the flow of water out of the storage chamber 16 through that opening 38 (ignoring any inconsequential leakage flow). When the valving member 44 is in the opened position, the illustrated valving members 44 are disposed essentially perpendicular to the wall face 35 and the associated opening 38 is essentially unobstructed. In the illustrated embodiment the drive 46 is responsive to changes in water level in the storage chamber 16 to move the valving member 44 between opened and closed positions.

The illustrated valving member 44 is formed as a rectangular door formed from plate. The drive 46 includes a hinge 48 (see FIG. 3) that mounts the door 44 to the upstream face 35 of the plate 34 and a float assembly 50 that urges the door 44 to move to opened and closed positions.

The hinge 48 enables the door 44 to pivot about a horizontal axis located a short distance below the bottom of the opening 38.

The float assembly 50 includes a tubular float 52 formed from plastic pipe and mounted to the inner face of the door 44 by a pair of brackets 54 and U-bolts 56.

The illustrated float 52 is a "T"-shaped member with the stem of the "T" centered and held in the brackets 54 and the leg of the "T" extending away from the door 44. Other float shapes and materials can be used in other embodiments, and the size, shape, construction, and attachment methods of the floats may vary within an embodiment.

Operation of the flow control device 14 in receiving and managing the discharge of runoff from the design storm is described next.

Assume that the storage chamber 16 is initially empty. The weight of each drive 46 applies a force to the associated door 44 urging the door 44 to the fully opened position. Thus all the openings 38 are open and essentially unobstructed at the beginning of the rain event, with the doors 44 generally disposed in horizontal planes.

As storm water first begins flowing into the storage chamber 16, the water level in the chamber interior 30 is initially below the lowest opening 38A. Water is discharged solely through the fixed orifice 36. Initially the discharge from the orifice 36 matches the intake of runoff water into the storm chamber 16, allowing the discharge flow rate curve to match the intake flow rate curve.

Because of the low water level in the storage chamber 14 and the increasing flow rate of runoff into the storage chamber 14, the intake rate begins to exceed the discharge rate and the water level in the storage chamber 16 begins to rise above the orifice 36.

The water level in the storage chamber 16 continues to rise above the bottom storage chamber elevation 30, and the water level reaches the lowest opening 38A. As the pressure head at the orifice 36 increases, the discharge rate of the orifice 36 increases also. Water now begins to be discharged from the opening 38A, however, in addition to the water discharged from the orifice 36. Thus the rate of discharge from the flow control device 14 is now greater than that possible through the fixed orifice 36 alone, allowing the discharge rate to follow more closely the intake rate.

The water level in the storage chamber 16 continues to rise, and begins to submerge the float 52 attached to the door 38A. The float 52 when submerged in the water generates a buoyant force that urges the associated door 44 to the closed position. When the float 52 is fully submerged, the buoyant force is sufficient to move the door 44 to the closed position, fully obstructing the opening 38A and essentially stopping the discharge of water through the opening 38A.

In the illustrated embodiment the float 52 is positioned relative to the door 44 such that the door 44 does not move to its closed position until the water level is slightly above the top of the opening 38A. As the water level increases above the bottom of the opening 38A, the pressure head at the opening 38A increases and the discharge rate through the opening 38A increases.

Before the opening 38A closes, the water level has reached the next opening 38B and water is being simultaneously discharged from the opening 38B, the opening 38A, and the orifice 36. Again, the rate of discharge from the flow control device 14 is now greater than that possible through the fixed orifice 36 alone and more closely follows the intake flow rate.

Immediately after the opening 38A closes, water is being discharged from the opening 38B and the orifice 36. The increasing pressure head at the orifice 36 continues to increase the discharge rate of the orifice 36, and the increasing pressure head at the opening 38B increases the discharge rate of the opening 38B to again more closely follow the intake flow rate.

As the water level rises, each lower opening 38 of an vertically adjacent pair of openings closes when the water level rises above the lower opening. Each upper opening 38 of the pair begins to discharge water before the lower opening closes. At all times when the water level is above the bottom of the lowermost opening 38A and below the water level closing the uppermost opening 38F, water is being discharged from both the orifice 36 and one or more of the openings 38.

The openings 38 are sized, shaped, and positioned such that the total rate of discharge from the orifice and the one or more active openings increases with increasing water level in the storage chamber 14. When the intake flow rate exceeds the maximum desired discharge rate, the excess runoff water is stored in the storage chamber 16 for later discharge.

As the water level in the storage chamber 16 rises, the pressure head at the orifice 36 increases and the discharge rate from the orifice 36 increases. The "headroom" between the orifice discharge rate $Q_o$ and the maximum discharge rate Q decreases and so the discharge rate from the active openings 38 must decrease as the water level in the storage chamber 16 rises.

As can be seen in FIG. 3, each upper opening 38 is narrower than the adjacent lower opening 38. This reduces the discharge area of each upper opening 38 at the same pressure head as the adjacent lower opening 38 to reduce the discharge rate from the active openings 38 as the water level in the storage chamber increases.

The openings 38 are sized, however, to cooperate with the orifice 36 so that the discharge rate through the flow control structure 22 as the water level in the storage chamber 16 rises substantially matches the intake flow rate until the intake flow rate is about equal to Q. At that point the orifice 36 and the active openings 38 are sized so that the average discharge rate from the flow control structure 22 is about equal to Q although the intake flow rate begins to exceed Q. The excess flow of storm water into the flow control device 14 is stored in the storage chamber 16.

When the water level increases to close the uppermost opening 38H, water is being discharged from the storage chamber 16 solely through the orifice 36. The pressure head at the orifice 36 is substantially equal to the depth of the water in the storage chamber 16, and the orifice 36 is discharging at nearly its maximum rate.

The storage chamber 16 is sized so that the water level is just below the bottom of the overflow opening 39 when the volume of water stored in the storage chamber 16 reaches A. The illustrated orifice 36 is sized such that when the storage chamber 16 is full and the openings 38 are closed, the orifice discharge rate is Q.

The volume of the storage chamber 16 is sized to store enough water from the design rain event to enable reducing the maximum discharge rate to Q as compared to the maximum discharge rate from the developed area 12 without runoff management. The storage chamber 16 is designed to become full when the storm water flow rate into the flow control device 14 drops back to Q after peak.

If the runoff volume exceeds the design rain event, the water level in the storage chamber 16 may rise above the bottom of the overflow opening 39 and will be discharged through the overflow opening 39 into the discharge chamber 19. The discharge chamber 19 may have a larger storage volume than the storage chamber 16 to store some of the overflow, and/or may be connected to additional drain pipes for increased discharge from the flow control device 14 in more severe rain events.

As the flow rate into the flow control device 14 drops below Q, the water level in the storage chamber 16 begins to drop and the pressure head at the orifice 36 decreases, decreasing the discharge rate from the flow control device 14.

As the water level in the storage chamber 16 falls, the openings 38 successively open, allowing discharge from the active openings in addition to the discharge from the orifice 36.

The weight of each drive 46 urges the door 44 associated with the drive 46 to move from the closed position to the opened position. As the water level drops across an opening 38, the float 52 begins to be exposed and the buoyant force generated by the float 52 decreases. The drive 46 is designed with the float 52 positioned such that the door 44 moves to the opened position when the water level is just above the top of the opening 38.

Figure 1:
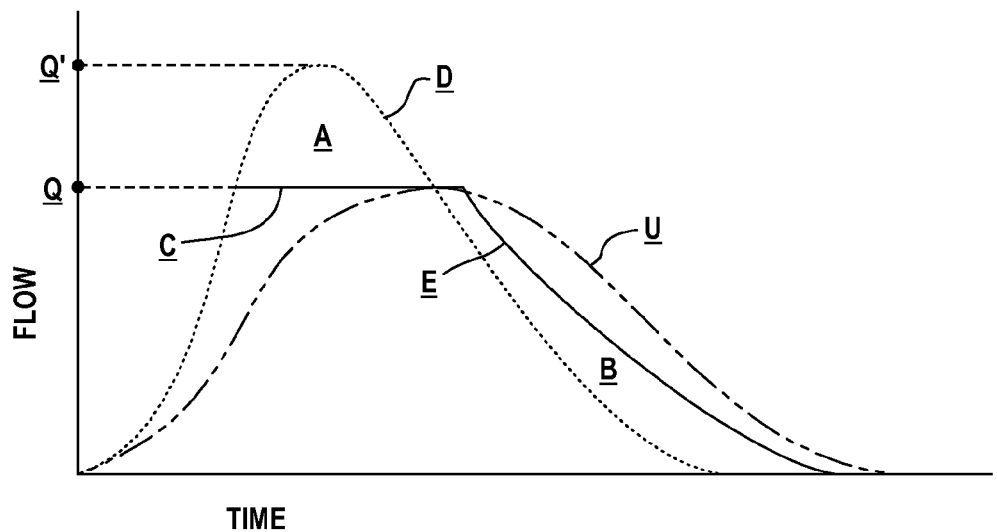
FIG. 1 shows hydrologic flows from a rain event on an undeveloped area of land, the same land area after development, and from an idealized flow control device that manages the release of storm water from the rain event.
Figure 5:
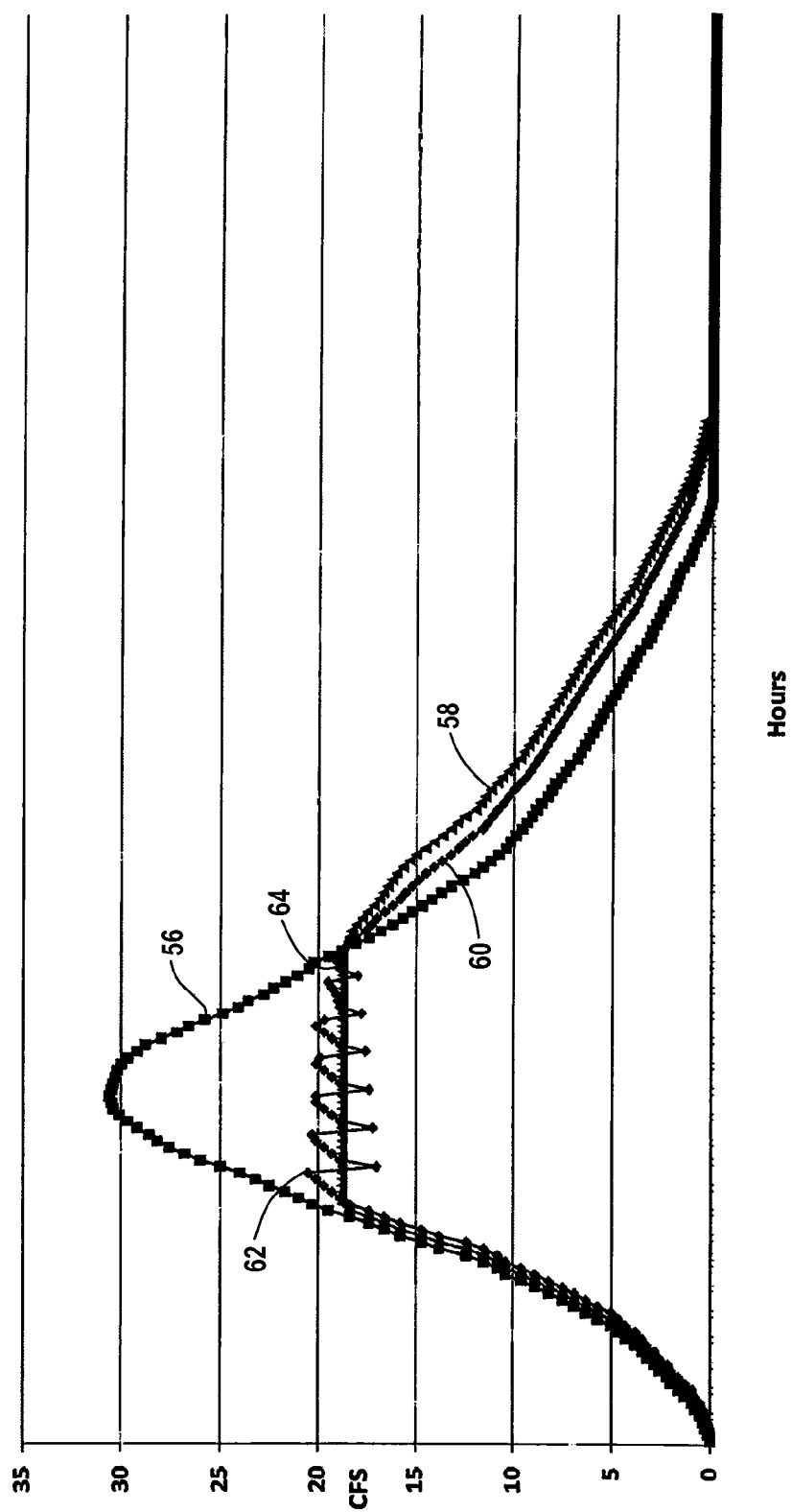
FIG. 5 shows hydrologic flow from the flow control device shown in FIG. 2 from a rain event and from the same land area without storm water management.

FIG. 5 shows the hydrologic flow curve 56 (corresponding to curve D of FIG. 1) representing the intake flow of storm water runoff from the developed land 12 for the design rain event, the ideal hydrologic flow curve 58 for an ideal flow control device managing the storm water runoff, and a hydrologic flow curve 60 representing the discharge of runoff from the flow control structure 22 (which curve 62 can be deemed to be identical to the discharge curve of the flow control device 14).

The design rain event has a peak flow rate Q' of about 31 cubic feet per second (CFS). The desired managed peak flow rate Q is about 19 CFS.

If the flow control structure 22 is able to generally discharge flow at the desired maximum discharge rate Q, then the descending leg of the ideal hydrologic flow curve 56 and the descending leg of the structure hydrologic flow curve 60 will essentially be identical.

The flow control structure 22 initially discharges runoff at essentially the same rate as the intake rate. The curve 60 closely follows the intake flow curve 56 until the first opening 38A closes essentially at a first point 62 on the curve 60. The discharge rate then increases until the second opening 38B closes. The sequential closings of the openings 38A-38H causes the discharge curve 60 to be a sawtooth curve between point 62 and a second point 64 (the point at which the highest elevation opening 38H closes).

When the opening 38H closes, the storage chamber 16 is substantially full and the sole discharge is through the orifice 36 at a discharge rate of Q.

The openings 38 of the illustrated embodiment flow control structure 22 are sized and positioned so that the average discharge rate of the sawtooth portion of the discharge curve 60 between first point 62 and second point 64 is Q. In other possible embodiments of the flow control structure 22, the number, size, shape, and positioning of the openings 38 can be selected to limit the peaks of the sawtooth at or below Q if required by the jurisdiction.

After the intake flow rate drops below Q, the storage chamber 16 begins to empty and the openings 38 sequentially open as previously describe to assist the orifice 36 in discharging the stored water. The curve 60 closely follows the ideal discharge curve until the storage chamber 16 is empty.

The features of the flow control device 14 enable an engineer great flexibility in designing an embodiment of the flow control device for a design rain event and a maximum discharge rate Q. The size, shape, number, and relative positions of the openings 38, as well as the behavior of the drives 46 in opening and closing the valving members 44 in response to changes in water level in the storage chamber 16 can vary to meet design needs, as well as the volume and shape of the storage chamber 16 to meet water storage and pressure head generation needs.

A computer program or programmable spreadsheet can model the flow of storm water runoff into the storage chamber 16 and the discharge of water from the flow control structure 22, and can be used to design a flow control device 14 that meets design needs or goals.

The lowest opening 38A of the flow control device 14 described above is above the orifice 36. In other possible embodiments, the lowest opening 38 may be at essentially the same elevation as the orifice 36, be below the orifice 36, or may extend vertically from and beyond the orifice 36. This enables higher discharge rates when the storage chamber 34 from the beginning of the rain event and may permit better matching of the discharge flow rate with the intake flow rate during the beginning portion of the rain event.

The orifice 36 in the illustrated embodiment is a circular orifice and is the sole orifice of the flow control structure 22. In other possible embodiments the orifice 36 may be shaped differently (rectangular, oval, etc.). The flow control structure 22 may include multiple orifice openings at the same or at different elevations, with the same or with varying orifice shapes.

Figure 6:
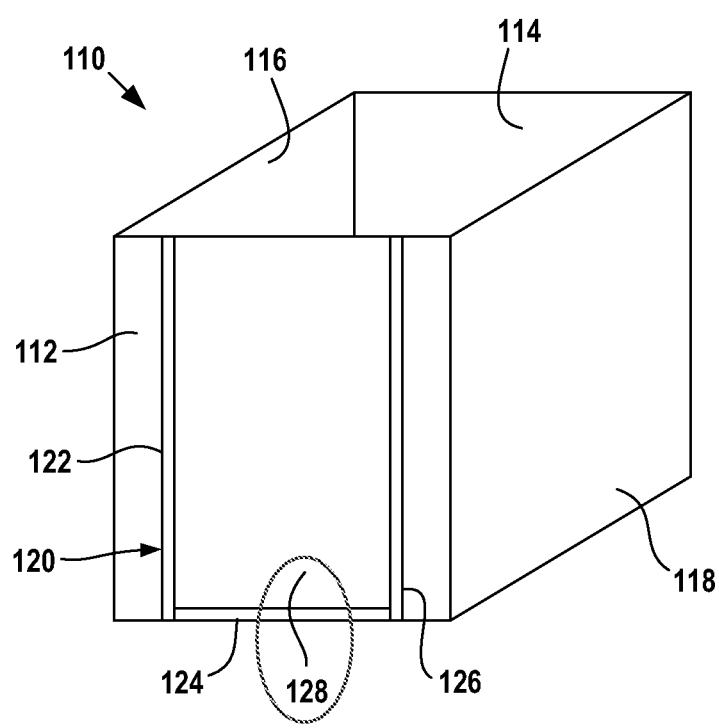
FIG. 6 is a simplified perspective view illustrating an embodiment of a mounting structure mounting the flow control structure in the flow control device.

FIG. 6 illustrates a possible construction for mounting the flow control structure in the flow control device. A storage chamber 110 corresponding to the storage chamber 16 has a generally rectangular cross section, with generally planar walls that include an upstream front wall 112, a downstream rear wall 114, and a pair of side walls 116, 118. To simplify the drawing, the side walls are not shown extending to a discharge chamber.

The front wall 112 includes a frame 120 formed from channel members 122, 124, 126 and a steel plate 128 that is held in the frame 122. The plate 128 can be held in the frame 120 by grout or by other known attachment means or materials. The plate 128 corresponds to the wall 34 and has formed therein the orifice and discharge openings (not shown) similar to the orifice 36 and openings 38 of the wall 34.

This embodiment illustrates that prefabricated flow control devices in which substantially all of the device but the plate 128 can be constructed ahead of time for inventory. The plate 128 is manufactured later and installed into the frame 120 of the prefabricated device portion. The plate 128 includes the required orifice and discharge openings, and may have the valving mechanisms attached to the plate after installation of the plate in the frame. Even after installation of the flow control device on site, a different plate 128 could be installed later to meet (for example) the needs of post-installation development.

Figure 7:
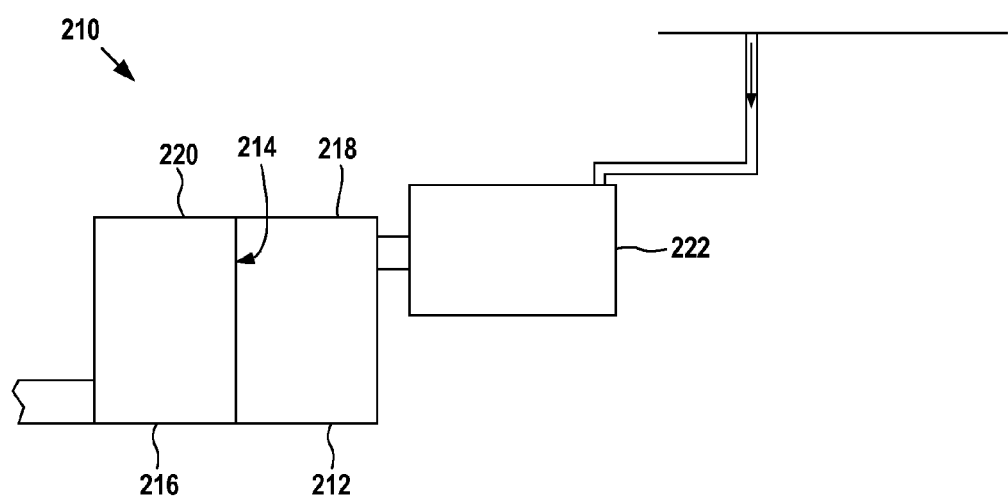
FIG. 7 is similar to FIG. 2 but illustrates a storm water management system having a second embodiment flow control device.

FIG. 7 illustrates a second embodiment storm management system 210 similar to the storm management system 10 but having a flow control device 212. In this embodiment the flow control device 212 includes a flow control structure 214 similar to the flow control structure 22 but mounted in a large pipe 216. The flow control structure 214 divides the pipe 216 into an upstream storage chamber 218 and a downstream discharge chamber 220. In this embodiment the flow control structure 214 does not include an overflow opening. Instead, the upstream basin 222 includes an overflow pipe (not shown) that bypasses the flow control device 212 and flows the overflow directly to the discharge pipe.

The illustrated valving mechanisms 42 each includes a door 44 and a float 46 formed as separate bodies. This enables the relative position of the float 46 and the door 44 to vary to change the opening and closing behavior of the valving mechanism with changes in water level across an opening. In other possible embodiments of the valving mechanism 42, the door 44 could itself be constructed as a buoyant body to generate buoyancy force urging the door closed, and the weight of the buoyant door urges the door to the opened position. In such embodiments the drive 46 includes the valving member 44 being configured to generate a buoyant force urging the valving member closed and weight urging the valving member open.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art, as well as such changes and alterations that fall within the purview of the following claims.

The invention claimed is:

1. A flow control device comprising:
   a storage chamber defining an interior volume for storage of water, the water defining a first water level when the storage chamber is full of water and a second, lower water level vertically spaced from the first water level when the storage chamber is empty;

the storage chamber comprising an inlet configured to receive water into the interior of the storage chamber and a wall defining at least a portion of said interior volume;

a plurality of vertically spaced through openings extending through the wall, each opening configured and disposed to flow water from the interior of the storage chamber and out of the storage chamber;

a plurality of valving mechanisms, each valving mechanism being associated with a respective opening and operable to open and close the opening associated with the valving mechanism;

each valving mechanism comprising a valving member movable between opened and closed positions and a drive operable to move the valving member between opened and closed positions, the valving member when in the closed position closing the opening associated with the valving member, the valving member when in the opened position permitting flow through the opening; and the drive responsive to the water level in the storage chamber to move the valving member from the opened position to the closed position when the water level in the storage chamber rises and to move the valving member from the closed position to the opened position when the water level in the storage chamber falls.

2. The flow control device of claim 1 wherein each drive comprises a float attached to the valving member and disposed in the storage chamber, the float generating a buoyancy force urging the associated valving member to the closed position when the valving member is at least partially submerged under water.

3. The flow control device of claim 2 wherein each float is vertically offset away from the valving member when the valving member is in the closed position.

4. The flow control device of claim 1 wherein at least one of the said valving mechanisms is operable to close the opening associated with the said at least one valving mechanism after the opening associated with the valving mechanism is fully underwater.

5. The flow control device of claim 1 wherein each drive comprises a weight attached to the valving member, the weight urging the valving member to the opened position.

6. The flow control device of claim 1 wherein at least one of the said valving mechanisms is operable to move the valving member associated with the valving mechanism from the closed position to the opened position after the opening associated with the valving member is partially underwater.

7. The flow control device of claim 1 wherein the valving member of at least one of the said valving mechanisms comprises a vertical planar surface that engages the wall when the valving member is in the closed position.

8. The flow control device of claim 1 wherein the drive mechanism of at least one of the said valving mechanisms comprises a hinge connection attaching the valving member associated with the drive mechanism to the wall, the hinge connection defining a pivot axis, the valving member rotatable about the pivot axis between opened and closed positions.

9. The flow control device of claim 1 wherein each opening extends between an upper side and a lower side vertically spaced from the upper side, the lower side of each of the plurality of openings spaced apart from one another at different elevations.

10. The flow control device of claim 9 wherein the valving mechanisms are arranged to sequentially open the openings as the water level in the storage chamber falls from full to empty.

11. The flow control device of claim 9 wherein the valving mechanisms are arranged to sequentially close the openings as the water level in the storage chamber rises from empty to full.

12. The flow control device of claim 1 comprising a fixed orifice extending through the wall fluidly communicating the interior of the storage chamber with the exterior of the storage chamber.

13. The flow control device of claim 12 wherein the fixed orifice is disposed at a lower elevation than some or all of said openings.

14. The flow control device of claim 1 wherein all the openings are closed before the storage chamber is full as the water level rises from empty to full.

15. The flow control device of claim 1 wherein the storage chamber comprises a round pipe, the wall disposed inside the pipe.

16. The flow control device of claim 1 wherein the storage chamber has a generally box-like shape, the wall forming one of the sides of the box.

17. The flow control device of claim 1 wherein the storage chamber comprises a frame formed from elongated channel members, the wall a one-piece member held by the frame.

18. The flow control device of claim 1 wherein the wall is a one-piece steel member.

19. The flow control device of claim 1 wherein each valving member is a plate and each drive comprises a float attached to the valving member associated with the drive and a hinge connection attaching the valving member to the wall for pivotal movement of the plate between opened and closed positions.

20. A method for regulating the rate of discharge of water from a storage chamber after a rain event, the method comprising the steps of:

(a) flowing water generated by a rain event into a storage chamber, water in the storage chamber when the storage chamber is full defining a water level vertically spaced from a bottom elevation of the storage chamber;

(b) discharging the water in the storage chamber through a plurality of openings vertically spaced from one extending through the storage chamber as the water level in the storage chamber rises, each pair of vertically adjacent openings comprising a lower opening and an upper opening; and (c) sequentially closing each lower opening before the water level raises above the upper opening associated with the lower opening as the water level increases in the storage chamber.

21. The method of claim 20 comprising the step of:

(d) closing the uppermost opening before the storage chamber is full.

22. The method of claim 20 comprising the steps of:

(d) sequentially opening each upper opening before the water level falls below the lower opening associated with the upper opening as the water level decreases in the storage chamber.

23. The method of claim 20 comprising the step of:

(d) continuously discharging water from the storage chamber through a fixed-size orifice as the water level in the storage chamber increases.

* * * * *